United States Patent
Malkemes et al.

(10) Patent No.: US 6,647,015 B2
(45) Date of Patent: Nov. 11, 2003

(54) METHOD AND APPARATUS FOR PROVIDING A BROADBAND, WIRELESS, COMMUNICATIONS NETWORK

(75) Inventors: Robert Conrad Malkemes, Bricktown, NJ (US); Henry Sedwick Miiller, Yardley, PA (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/772,505

(22) Filed: Jan. 30, 2001

(65) Prior Publication Data

US 2001/0055351 A1 Dec. 27, 2001

Related U.S. Application Data

(60) Provisional application No. 60/206,133, filed on May 22, 2000, and provisional application No. 60/259,834, filed on Jan. 5, 2001.

(51) Int. Cl.$^7$ ............................................... H04L 12/28
(52) U.S. Cl. ...................... 370/401; 370/329; 375/222
(58) Field of Search ............................. 370/401, 310.1, 370/310, 329, 277, 278, 285; 375/222

(56) References Cited

U.S. PATENT DOCUMENTS

| | | | |
|---|---|---|---|
| 5,214,675 A | 5/1993 | Mueller et al. | 375/340 |
| 5,515,378 A | 5/1996 | Roy, III et al. | 370/334 |
| 5,613,191 A * | 3/1997 | Hylton et al. | 725/81 |
| 5,630,204 A * | 5/1997 | Hylton et al. | 725/116 |
| 5,708,961 A * | 1/1998 | Hylton et al. | 725/81 |
| 5,969,837 A * | 10/1999 | Farber et al. | 379/56.2 |
| 6,029,056 A * | 2/2000 | Kiyanagi et al. | 455/276.1 |
| 6,088,408 A | 7/2000 | Calderbank et al. | 375/347 |
| 6,115,427 A | 9/2000 | Calderbank et al. | 375/267 |
| 6,167,389 A * | 12/2000 | Davis et al. | 705/412 |
| 6,345,051 B1 * | 2/2002 | Gupta et al. | 370/395.51 |
| 6,466,610 B1 * | 10/2002 | Schilling | 375/141 |

FOREIGN PATENT DOCUMENTS

| | | | |
|---|---|---|---|
| EP | 0 599 632 | 6/1994 | H04L/12/28 |
| WO | 97/22196 | 6/1997 | H04L/25/02 |
| WO | 99/49586 | 9/1999 | H04B/7/00 |

OTHER PUBLICATIONS

Vandenameele, et al., "A combined OFDM/SDMA Approach for WLAN", IEEE, US May 16, 1999, p. 1712–1716.

International Search Report, PCT/US01/16816, dated Jul. 18, 2002.

Tarokh et al. "Space–Time Codes for High Data Wireless Communication: Performance Criterion and Code Construction" IEEE Transactions on Information Theory, vol. 44, No. 2, pp. 744–765, Mar. 1998.

Alamouti, Siavash M. "A Simple Transmit Diversity Technique for Wireless Communications" IEEE Journal on Select Areas in Communications, vol. 16, No. 8, pp. 1451–1458, Oct. 1998.

* cited by examiner

*Primary Examiner*—Hassan Kizou
*Assistant Examiner*—Saba Tsegaye
(74) *Attorney, Agent, or Firm*—William J. Burke (57) ABSTRACT

Method and apparatus for providing a broadband, wireless network comprising residential communications gateway that accepts all incoming communications signals and securely broadcasts those signals throughout a residence. Each communications appliance within the residence is outfitted with a receiver that decodes the broadcast signals and couples the signals to the input terminals of the associated communications appliance. The system is completely "plug-and-play" such that a user can quickly and easily utilize the gateway for many communications appliances.

26 Claims, 6 Drawing Sheets

METHOD AND APPARATUS FOR PROVIDING A BROADBAND, WIRELESS, COMMUNICATIONS NETWORK

This application claims benefit of U.S. provisional patent applications 60/206,133, filed May 22, 2000, and 60/259,834, filed Jan. 5, 2001, both hereby incorporated herein by reference in their entirety.

The invention relates to wireless communications networks and, more particularly, the invention relates to broadband, wireless communications networks for residential and enterprise use.

BACKGROUND OF THE DISCLOSURE

Residences are presently coupled to many sources of audio/visual entertainment, communications, and computing signals, including, computer modems, cable television feeds, satellite television feeds, telephone, over-the-air television and so on. Each of these sources of signals enters a residence and is routed via cables to an associated communications appliance, i.e., the telephone signals are routed through the home on a twisted-pair cable to a telephone, the cable television signals are routed through the home on a coaxial cable to a cable set top box, and so on. As such, a residence will have many cables, wires and other communications connections throughout the home. Each time an appliance is to be moved from one location to another, the signal cabling must be rerouted. Such cutting and splicing leads to noisy connections and signal degradation that severely effects the fidelity of the signal.

To remedy this problem, wireless local area networks (LAN) have been developed that implement the Institute of Electrical and Electronic Engineers (IEEE) standard 802.11a. This standard defines a wireless LAN system that uses orthogonal frequency division multiplexing (e.g., 48 carriers carrying 64-QAM signals in a 20 MHz wide channel) and defines the control layer to utilize the media access control (MAC) protocol. A plurality of the carriers are used as pilot tones to achieve receiver synchronization. Multipath interference is controlled by having many carriers propagating a low data rate signal, e.g., 256 kbit. As such, the data rate for the system is limited within a given bandwidth. Conversely, higher data rates necessitate greater bandwidth.

Therefore, a need exists in the art for a broadband, wireless network that provides a user with a flexible environment for using and locating their communications appliances.

SUMMARY OF THE INVENTION

The present invention provides a residential communications gateway that accepts all incoming communications signals and securely broadcasts those signals throughout a residence. Each communications appliance within the residence is outfitted with a receiver that decodes the broadcast signals and couples the signals to the input terminals of the associated communications appliance. The system is completely "plug-and-play" such that a user can quickly and easily utilize the gateway for many communications appliances.

Each receiver is equipped with an antenna array and a multipath signal processor to ensure that each communications appliance received a robust, error free signal no matter where it is located in the home. The multipath signal processor comprises adaptive signal processing in both spatial and temporal domains to ensure that multipath signals are sufficiently suppressed to enable accurate decoding of the received signal.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
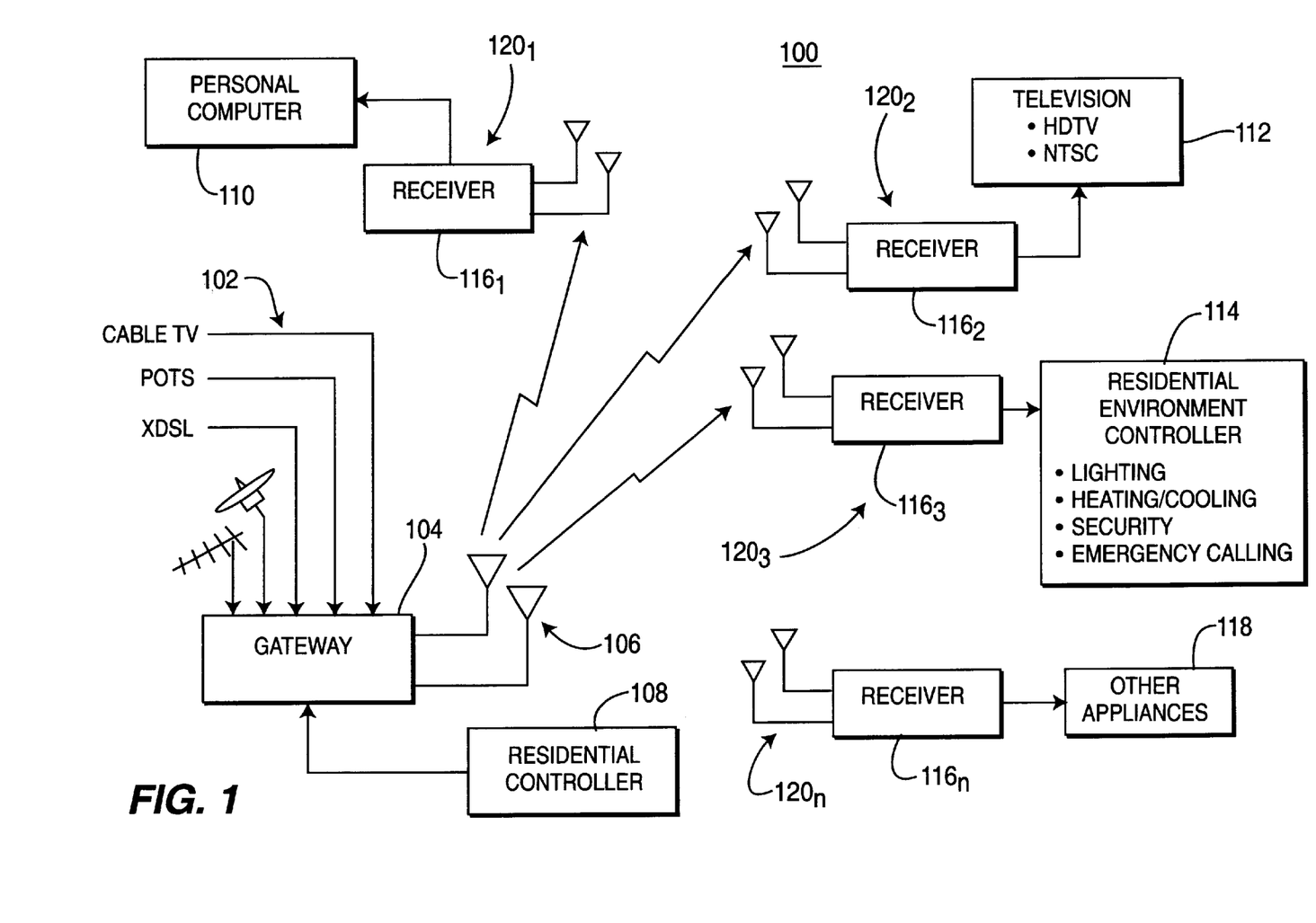
FIG. 1 depicts a block diagram of a wireless network system in accordance with the present invention.

FIG. 1 depicts a block diagram of a broadband, wireless communication system 100 in accordance with the present invention. This system provides a broadband residential or small home office (SOHO) wireless network. The system 100 comprises a gateway 104 and a plurality of receiver nodes $120_n$ (n is an integer). Each receiver node $120_n$ comprises a receiver $116_n$ and a communications appliances 110, 112, 114, and 118 coupled to the receiver $116_n$. The gateway 104 receives a plurality of input signals from a plurality of sources 102 including a cable feed, a plain old telephone system (POTS) feed, a satellite television feed, over-the-air television antenna, and the like. The gateway 104 is also optionally coupled to a residential controller 108 that provides the ability to control various environmental aspects of a residence (e.g., lighting, heating, cooling and so on) through a wireless system.

As illustrated, FIG. 1 emphasizes that the entertainment DTH, cable, and terrestrial channel tuners are located within the gateway. Channel tuners are no longer associated with the entertainment appliance. Air and physical interface access control, payload mapper and demapper functions are executed within the logic blocks of the gateway. Network control functions also are executed within the logic of the gateway.

Conditional access control for DTH is handled within the traditional decoder module of the A/V appliance so that encrypted entertainment remains encrypted within the in-home network until de-encrypted at the specific subscribing appliance. The traditional interface between the logic block and the appliance is NRSS Level B for information flowing into the appliance and $I^2C$ for control going back into the in-home network. Cable pay per view (PPV) may be handled within the gateway.

The network itself, at 5.6 GHz, is comprised of three 100 MHz wide bands. These bands are channelized into fifty 6 MHz bands where each channel carries 40 Mbits/secs for a total capacity of 2 Gbits/sec. Control and Internet links can be multiplexed within the 6 MHz wide in-home bands as shown, for example, in Table I:

TABLE I

| Channel Function | Channel Bandwidth | Maximum Available Bands--Adjacent Band Usage |
|---|---|---|
| Delivery of encrypted entertainment from external broadband pipes to appliances at 40 Mbits/sec. | 6 MHz | 50* |
| In-home multimedia/data channels at 10 Mbits/sec | 6 MHz | 4 per channel** |
| Internet Uplinks at 1 Mbit/sec | 6 MHz | 10 per channel** |

*Dedicated non-multiplexed bands.
**Multiplexed within one 6 MHz band using a label protocol.

In a typical home configuration, assuming three DTH picture-in-picture/internet TV sets and two PCs plus DTH and xDSL Internet service subscriptions, the actual channel assignments for this typical network are shown below in Table II:

TABLE II

| Channel Function | Bandwidth Required | 6 MHz Bands Used |
|---|---|---|
| Delivery of encrypted entertainment or internet to TVs (6@40 Mbits/sec) | 6 MHz | 6 |
| PC internet downlinks (2@10 Mbits/sec) | 6 MHz | 1 |
| PC internet uplinks (2@1 Mbits/sec) | 6 MHz | 1 |

Figure 4:
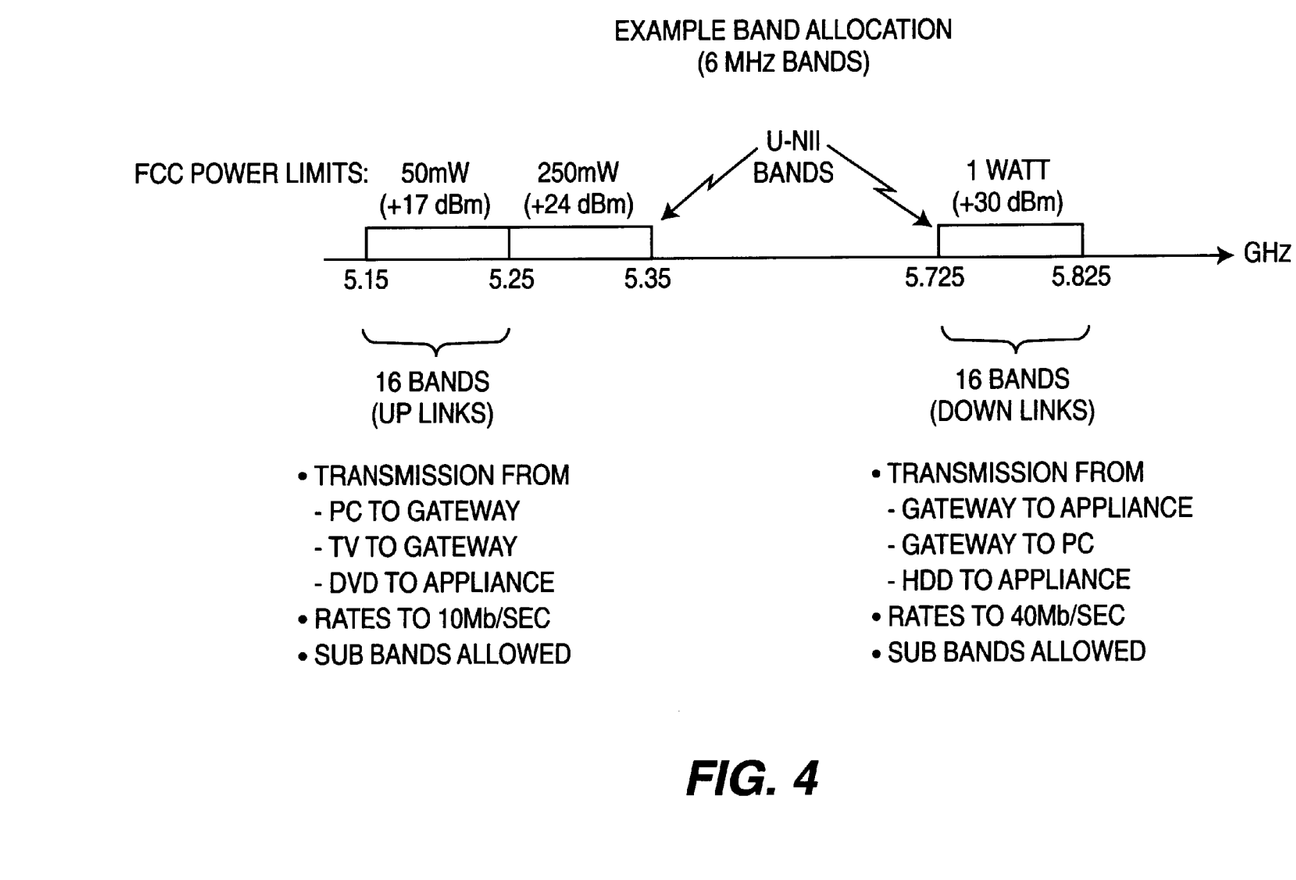
FIG. 4 depicts the frequency allocation for the wireless network system of FIG. 1.

Total 6 MHz band usage in this example is 8, leaving 42 free for near neighbor usage and other 5.6 GHz services. Two 6 MHz bands are dedicated to each TV to support regular high definition television (HDTV) viewing via a DTH service provider plus windows for HDTV PIP or Internet access, one 6 MHz band is dedicated to downloading the Internet to the two or three PCs and another lightly loaded channel is used for uploading from the PCs to the Internet. A bandwidth utilization example is summarized in FIG. 4.

The modulated signals are transmitted from the gateway 104 to the receivers $116_n$ through one or more antennas 106. The transmitted signals are received and decoded at various locations throughout the residence. The receivers 116 can be up to 100 meters from the gateway 104. Each receiver 116 decodes the relevant signals for the appliance that is attached to the receiver. For example, the receiver $116_1$ decodes the signals that are applicable to the personal computer 110, the receiver $116_2$ decodes the signals that are applicable to the television (or home theatre system) 112, and so on. The uplink uses a time division multiple access (TDMA) frame structure having timing synchronized to downlink timing markers. Uplinks and downlinks are time based synchronized in pairs. As such, the transmissions are packetized and each packet is addressed to a particular receiver node. Consequently, the gateway 104 can route signals to any receiver node 120 within the system 100.

To facilitate the high data rates of the system, a 256/64 QAM modulation technology is used in the downlink. The occupied bandwidth is less than 6 MHz allowing a sufficiently large number of useable channels in the higher power portion of the 5 GHz band. With appropriate IF filtering, adjacent channel performance levels in excess of 40 dB can be achieved. A concatenated trellis code and block code structure is used to provide adequate Forward Error Correction or a Turbo Code method may also be employed based upon the outcome of further architectural refinements.

The QPSK modulation technology is used for the uplinks. This occupies a bandwidth of less than 6 MHz with a maximum data rate of 10 Mbits/sec.

The most difficult class of problems associated with this 5.6 GHz band is that of multipath. In this frequency band and in a home or SOHO environment, the multipath takes on a broad range of characteristics including frequency flat fading, frequency selective fading and high frequency Doppler distortion. To combat this set of problems a multiple antenna diversity technique is used in the form a spatial diversity equalizer/combiner. At least two antenna inputs at a receiver node are equalized and combined to reduce the effects of multipath encountered in the home or home/office environments. This approach achieves the maximum level of Quality of Service (QoS) that can be achieved without resorting to complex MAC protocols.

To avoid interference and allow maximum user capacity, a Carrier Sense Multiple Access Collision Detection, or CSMA/CD, channel access technique is employed. If contention is sensed, the next best available channel may be utilized by the system. Maximizing the overall available number of channels within the allowable spectrum eases the burden in a multidwelling unit application. A Forward Overhead Control Channel is embedded in the downlink data stream, which advises and controls uplink time slot allocation and channel bandwidth aggregation. Channel access is also controlled through this mechanism.

The uplink consists of a TDMA based 10 MB/s QPSK modulated data system in which burst demodulation must be employed to allow multiple users to access the hub unit as required.

Finally, power control of both uplink and downlink traffic channels, can be used to allow maximum utilization of spectrum in high capacity environments and mitigate some of the technical radio design challenges associated with wide dynamic signal range. Because more than one user is multiplexed on a single carrier the power control algorithm must accommodate the lowest recovered signal strength user as its minimum case.

Figure 2:
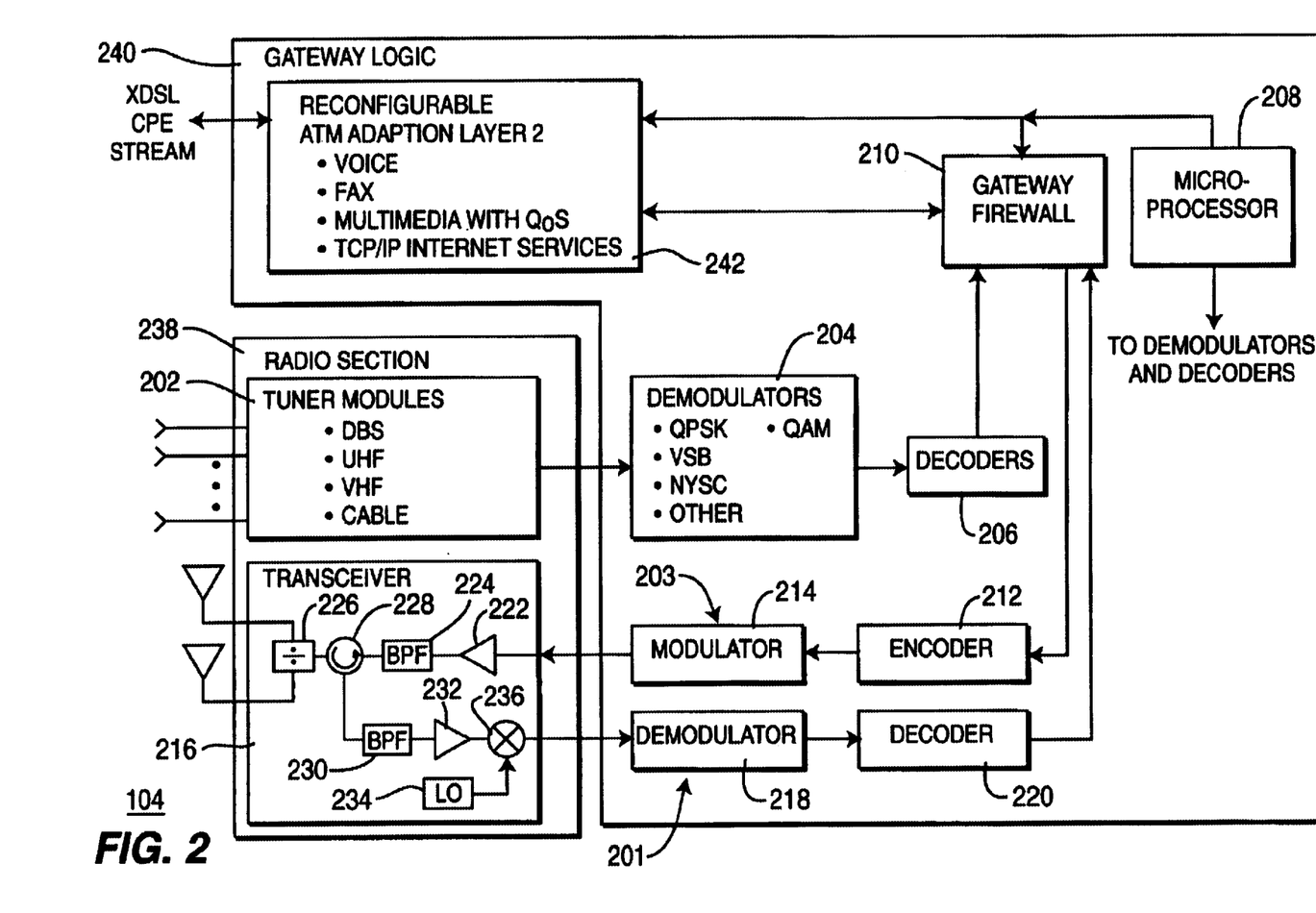
FIG. 2 depicts a block diagram of a network gateway of FIG. 1.

FIG. 2 depicts a detailed block diagram of the gateway 104 comprising a gateway logic 240 and a radio section 238. The radio section 238 comprises a plurality of tuner modules 202 (e.g., direct broadcast satellite (OBS), ultra-high frequency (UHF), very high frequency (VHF), and so on) and a transceiver 218. The gateway logic 240 comprises a plurality of demodulators 204 (e.g., quadrature phase shift keying (QPSK), vestigial side band (VSB). standard television and the like), decoders 206, a reconfigurable ATM adaptation layer 2 242, a microprocessor 208, a gateway firewall 210, an encoder 212, a modulator 214, a demodulator 218 and a decoder 220. The various sources of RF signals are coupled to the tuner modules 202, which select particular signal channels for reception. Each appliance has a corresponding tuner module 202. The tuner modules filter and down convert each of the selected channels. The channels are selected by a user or users via the back channel communication link from the receivers 116 to the gateway 104. The back channel operation is discussed below. The demodulators 204 demodulate the down converted signals. The decoders 206, then decode the signals including performing error correction to form baseband video The baseband video is coupled to the gateway firewall 210. The tuner modules 202, the demodulators 204, and the decoders 206 are all controlled by the microprocessor 208.

The reconfigurable ATM adaptation layer 2 242 couples the gateway firewall 210 to an xDSL CPE stream to enable the system to be used to distribute voice, data, fax, multimedia content, and TCP/IP Internet services throughout a residence. The content from the xDSL stream can then be displayed by any one of the appliances in the network.

The gateway firewall 210 digitizes the decoded signals (if necessary) and provides firewall services. The firewall services ensure that unauthorized users cannot access the gateway from outside the residence without proper authority. Additionally, the gateway firewall 210 provides encryption to ensure that neighboring residences are not capable of viewing each other's programming. The firewall and encryption services are provided by using a well-known protocol such as the media access control (MAC) protocol.

The encrypted baseband video signals are coupled to an encoder 212. The encoder 212 compresses the signal using, for example, run-length coding, or some other form of lossless encoding. The encoded signal is coupled to modulator 214, where the signal is modulated onto a 5–6 GHz carrier. The modulation is an M-ary quadrature amplitude modulation (QAM). To transmit broadband signals such as HDTV, the modulation is selected to be 256-ary QAM. For lower bandwidth signals, the modulation index can be lowered to, for example, 64.

A transceiver 216 amplifies the modulated signal and couples the signal to a pair of antennas 106. Specifically, the signal passes through a wide-band amplifier 222, a bandpass filter 224, a diplexer 228, and a power splitter/combiner 226. The diplexer 228 and band pass filter 224 may be fabricated as a single component. The diplexer 228 and power splitter 226 enables the transmitter and receiver to utilize the same antennas 106. The transmitter portion of the transceiver 216, for example, transmits a 1 Watt signal in the 5.75–5.85 GHz band (the UNII-band). Each of the transmitted signals carries 20–40 Mbps in a channel bandwidth of approximately 6 MHz. As such, many 6 MHz channels (one or more for each appliance) are transmitted in the UNII-band.

Additional antenna elements could be used with dynamic, beam forming circuitry such that the transmitted signal is "pointed" at the appliance that is to receive the signal being transmitted at any instant in time. Such antenna control provides multipath signal suppression at the receiver plus further enhancements of QoS without the complications of more complex MAC protocols.

The antennas 106 also receive control signals from various appliances within the residence. In one embodiment of the invention (not shown), only a single antenna is coupled to the back channel receiver 201 in the gateway 104. In another embodiment, both antennas are coupled to the receiver 201 via a splitter/combiner 226 and diplexer 228. Combining the antenna signals forms a spatial diversity combiner that suppresses multipath interference. An adaptive spatial diversity combiner that can be used in the gateway transceiver is described with reference to FIG. 2. Because the back channel data rate is relatively low, the back channel modulation is generally BPSK, QPSK or 4-ary QAM, both of which are relatively easy to receive, even in a noisy environment. As such, diverse antennas are not generally necessary.

The received signals, known as back-channel signals, are coupled through a diplexer 228, band pass filter 230, amplifier 232, mixer 236 and into a demodulator 218. The transceiver 216 provides amplification and downconversion such that the output of the transceiver 216 is an IF signal with a relatively high signal-to-noise ratio (SNR). The back-channel signal is typically in the 5.125–5.325 GHz band (the UNLI-band) and transmitted from the network appliances using 100 mW. The back channel can support 10 Mbits/sec using burst mode QPSK modulation. The demodulator 218 extracts the modulation (a baseband signal) from the carrier signal and couples the baseband signal to the decoder 220. The decoder 220 decodes the baseband signal. The back channel signal carries commands from the network appliances (120 of FIG. 1) to instruct the gateway 104 as to what signals to transmit to the appliances. The decoded signals are coupled to the microprocessor 208 for implementation.

Figure 3:
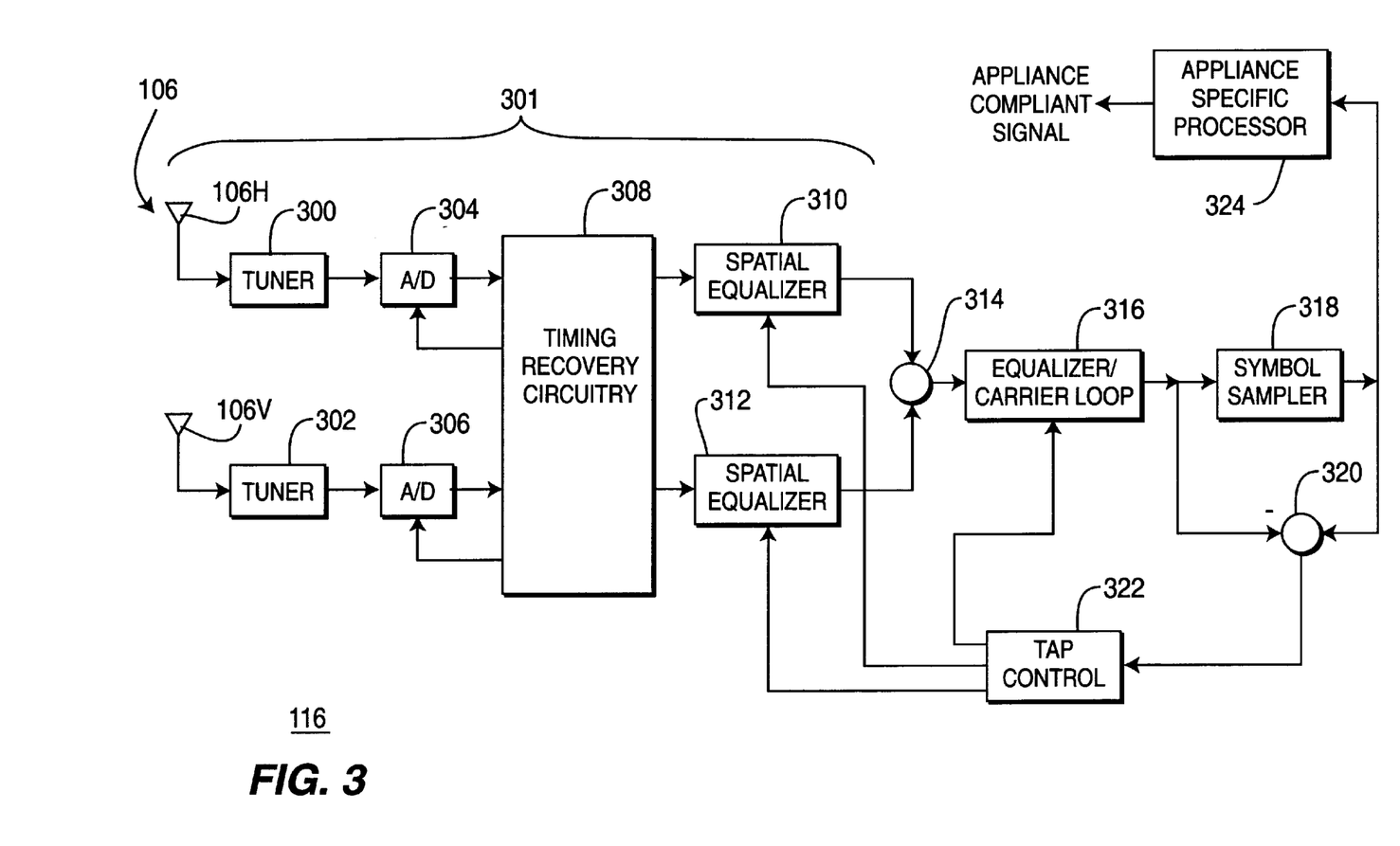
FIG. 3 depicts a block diagram of a receiver of FIG. 1.

FIG. 3 depicts a block diagram of a receiver 116 of FIG. 1 that uses a multipath processor 301 (referred to as a spatial diversity combiner) to combat multipath interference. Each antenna 106A and 106B is respectively coupled to tuners 300 and 302. These tuners 300 and 302 select one of the 64 available channels. The tuners 300 and 302 filter and down-convert the received signal to near baseband. The near baseband signals are respectively coupled to the analog-to-digital (A/D) converters 304 and 306. The digitized signals are applied to the timing recovery circuitry 308. The timing recovery circuitry 308 ensures that the A/D converters 304 And 306 accurately sample the symbols in the near baseband signal.

The samples are then coupled to separate spatial equalizers 310 and 312. These equalizers are multi-tap feed forward equalizers (FFE) that delay their respective signals to achieve equal delays in the received signals. The most difficult class of problems associated with this 5.6 GHz band is that of multipath. In this frequency band and in a home or SOHO environment, the multipath takes on a broad range of characteristics including frequency flat fading, frequency selective fading and Doppler distortion. To combat this set of problems a multiple antenna diversity technique is used to form a spatial diversity equalizer/combiner. At least two antenna inputs are equalized and combined to reduce the effects of multipath encountered in the home or home/office environments. Once spatially equalized by equalizers 310 and 312, the two signals are combined in combiner 314. The output of the combiner 314 is coupled to a single circuit 316 comprising both a temporal equalizer and carrier loop recovery circuit. The equalizer/carrier recovery circuit 316 comprises a decision feedback equalizer (DFE) that removes intersymbol interference and a carrier recovery loop that extracts the carrier from the equalized symbols. The carrier is used to derotate the symbols for sampling using the symbol sampler 318. Within the subtractor 320, the symbol sample is compared to the unsampled symbol to produce a symbol error that is coupled to the tap control 322. The tap control 322 uses the error signal to produce tap weight adjustments for the three equalizers: the two spatial equalizers 310 and 312 and the temporal equalizer 316. To provide such multipath processing in the gateway, similar circuitry may be included in the transceiver of the gateway.

The sampled symbols are coupled to the appliance specific processor 324. The processor 324 performs the necessary processing to convert the symbol stream into a signal that can be used by the appliance. For example, if the appliance is an NTSC television, the appliance specific processor 324 would convert the symbol stream into an NTSC signal. Receivers designed for other appliances convert the symbols into signals that are appropriate for those appliances. For example, an NTSC signal would be digitized and 3-D comb filtered in the gateway prior to encoding and transmission to a node in the system. An NTSC signal may be digitized in high definition (HD) or standard definition (SD). The receiver would convert the digital signal into a signal that is compatible with the television receiver. As such, the system can accommodate legacy television systems.

Figure 5:
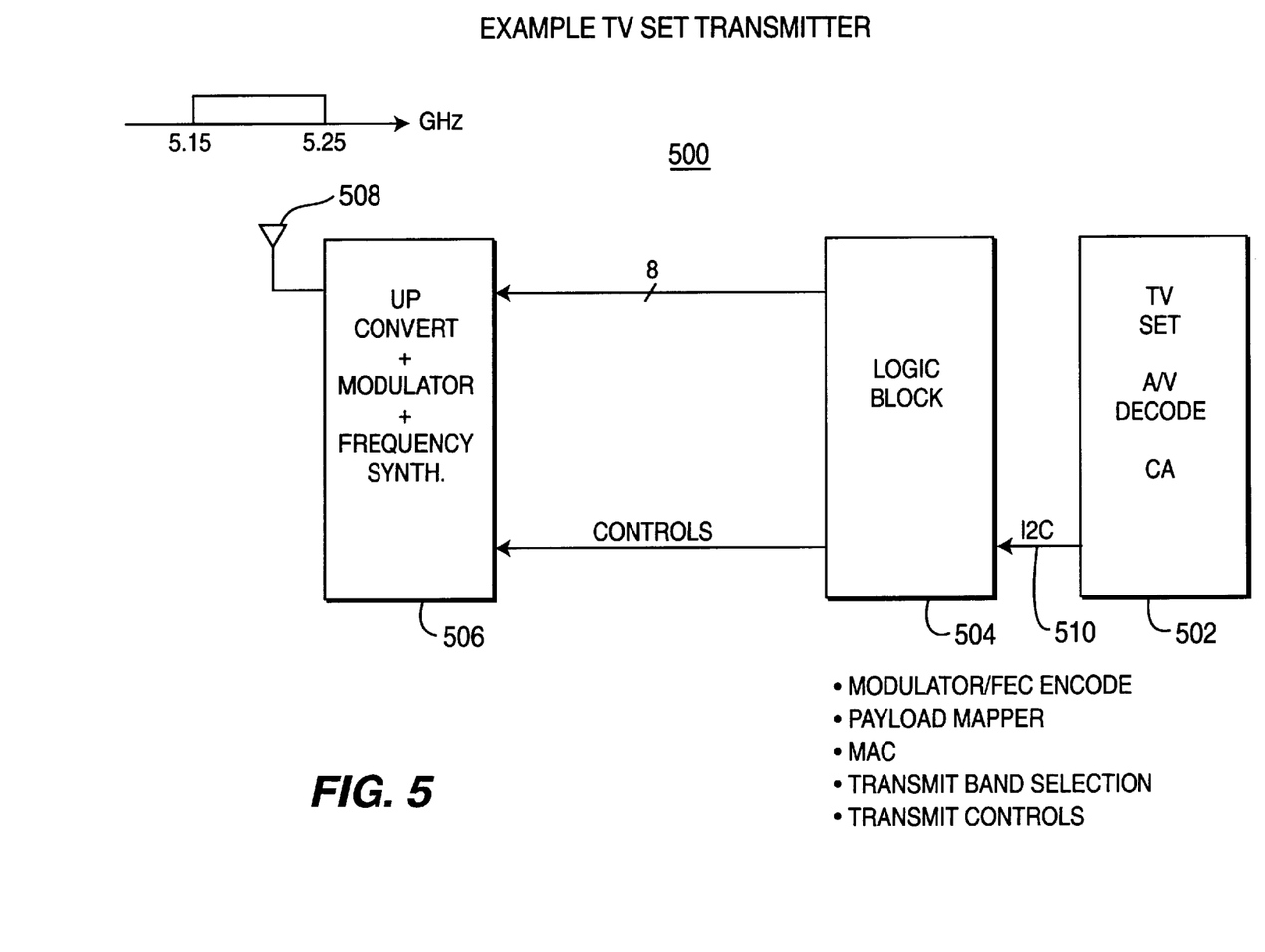
FIG. 5 depicts a block diagram of one embodiment of a back channel transmitter.

FIG. 5 depicts a back channel transmitter 500 for television appliance. The television set decoder 502 couples to the I²C bus 510 of the back channel transmitter 500. The I²C bus 510 carries command and control signals to a logic block 504. The logic block 504 contains a modulator/FEC encoder, payload mapper, MAC, transmit band selection and transmit control logic. The logic block 504 is coupled to the upconverter/modulator/frequency synthesizer block 506. The logic block 504 sends a control signal and an 8 bit data signal to the block 506. Block 506 modulates the command signal onto a carrier and upconverts the modulated signal to the back channel band. The signal is then coupled to one or more antennas 508. This transmitter 500 receives, for example, channel turning commands from the television 502 and sends those commands to the gateway. The gateway then adjusts a tuner module to receive the specified channel. Content from that channel is then wirelessly sent to the television appliance for display.

Figure 6:
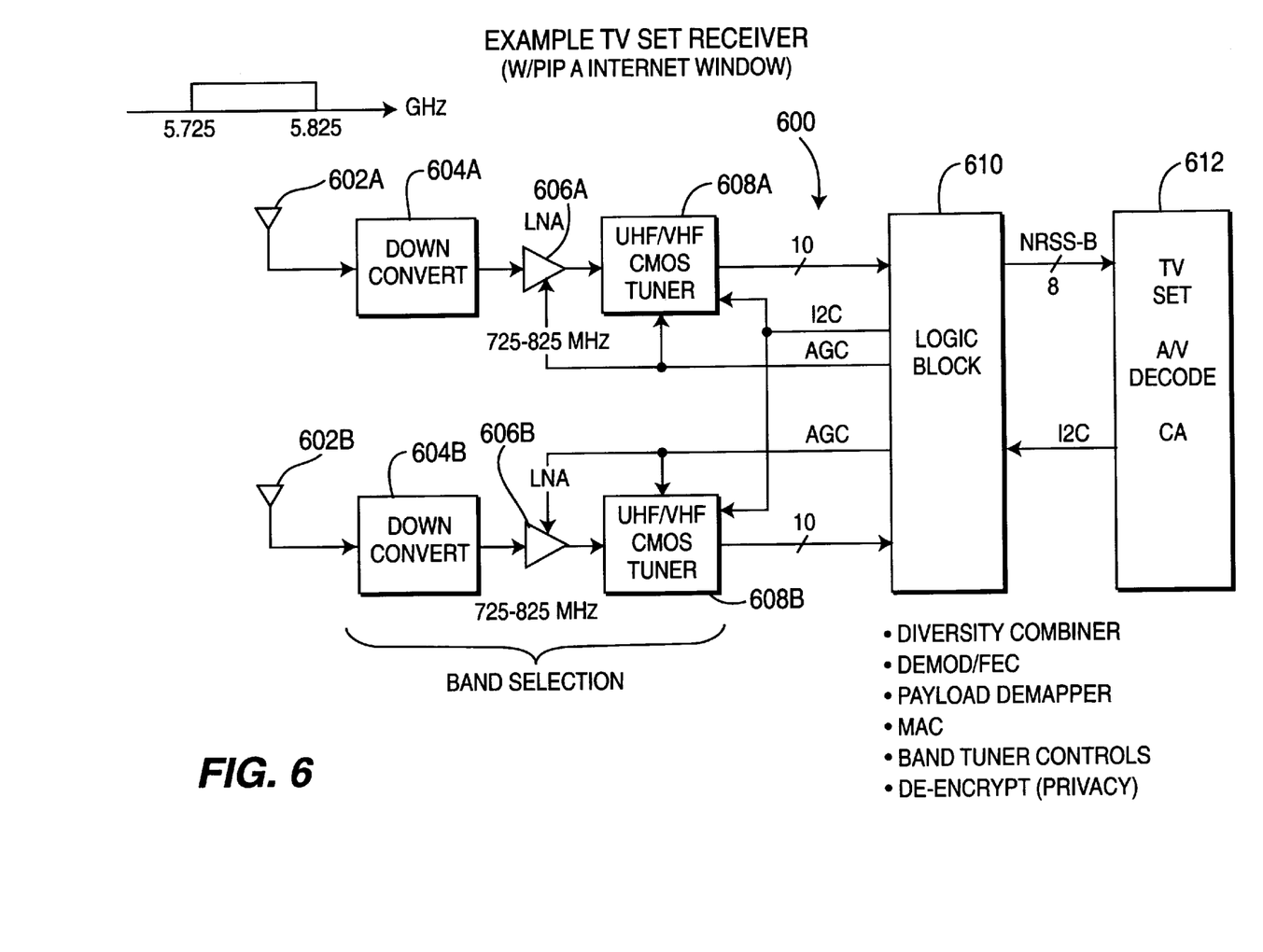
FIG. 6 depicts a block diagram of a specific embodiment of a receiver.

FIG. 6 is a block diagram of an illustrative receiver 600 that is used to receive both a primary television signal and a picture-in-picture (PIP) signal from the wireless network. The PIP signal may be an HDTV signal. Also the PIP signal may be received by a separate device such as a hand-held wireless device. The receiver 600 comprises one or more antennas 602A and 602B, a pair of down converters 604A and 604B, a pair of low noise amplifiers (LNAs) 606A and 606B, a pair of tuners 608A and 608B, and a logic block 610. The logic block 610 is coupled to a television set decoder 612.

The antennas 602A and 602B receive signals from the wireless network. Although two antennas are shown, those skilled in the art should understand that each antenna 602A and 602B may be an array of antennas and a diversity combiner. The signals are coupled to the down converters 604A and 604B to select a particular channel in the 5.725–5.8256 Hz band. The selected channels (one for each down converter) are converted to a 725–825 MHz band.

The down converters 604A and 604B are each coupled to an LNA 606A and 606B that adjust the amplitude of the signal. The gain of each LNA 606A and 606B is controlled by a gain control signal from the logic block 610. The amplified signals are each coupled to the tuners 608A and 608B. These tuners may be integrated circuit tuners similar to that disclosed in U.S. patent application Ser. No. 09/457,258, filed Dec. 8, 1999 and incorporated herein by reference. The tuners 608A and 608B are controlled by signals generated by the logic block 610.

The logic block 610 receives 10 bit digital signals from the tuners 608A and 608B. The logic block 610 provides diversity combining (if the down converters and tuners select the same channel), demodulation, forward error correction, payload demapping, MAC functionality, band tuner control, de-encryption, and the like. The logic block 610 produces 8-bit signals in NRSS-B format that are coupled to the television set decoder 612. The decoder 612 couples control signals to the logic block 610.

The receiver 600 may select two different television programs from the wireless network such that one signal can be displayed on the television as a primary video signal and the second signal can be displayed on the PIP television. Alternatively, one of the signals may be an Internet channel so that for example, the PIP could display an Internet web site or sites or other information provided by the Internet.

Although various embodiments which incorporate the teachings of the present invention have been shown and described in detail herein, those skilled in the art can readily devise many other varied embodiments that still incorporate these teachings.

What is claimed is:

1. Apparatus for providing a wireless local area network comprising:
    a gateway for receiving a plurality of signals, selecting specific signals from said plurality of signals and transmitting the selected signals through at least one antenna, wherein said gateway comprises a gateway firewall for providing a firewall and for encryption of the transmitted signals; and
    a receiver comprising at least two antennas, a spatial diversity combiner, a tuner coupled to each antenna, an analog-to-digital converter coupled to each tuner, a timing recovery circuit coupled to each analog to digital converter, a spatial equalizer for each digitized signal, a combiner for combining the output signals from each of the spatial equalizers, a temporal equalizer for supressing inter-symbol interference from the combined signal, a symbol sampler for sampling the symbols, and a tap controller for adjusting the tap weights of the spatial equalizers and the temporal equalizers, wherein said receiver receives said transmitted signals and converts said transmitted signals into a format that is compatible with a network appliance.

2. The apparatus of claim 1 wherein said plurality of signals comprise one or more signals selected from a group comprising analog cable television, digital cable television, plain old telephone signals, Digital Subscriber Line signals, satellite television signals, over-the-air television signals and any combination thereof.

3. The apparatus of claim 1 further comprising a transmitter coupled to said network appliance for transmitting a signal selection signal to said gateway.

4. The apparatus of claim 3 wherein said transmitter produces signals in the 5.15 to 5.25 GHz band.

5. The apparatus of claim 3 wherein said transmitter produces QPSK modulated signals.

6. The apparatus of claim 1 wherein said gateway comprises a transceiver for transmitting said selected signals and for receiving control signals from said network appliances.

7. The apparatus of claim 4 wherein said transceiver comprises a spatial diversity combiner and a plurality of antennas.

8. The apparatus of claim 7 further comprising an appliance specific procesor for processing the symbols to form an appliance compliant signal.

9. The apparatus of claim 1 wherein said gateway transmits signals in the 5.725 to 5.825 GHz band.

10. The apparatus of claim 1 wherein said gateway transmits 20 to 40 Mbits/sec in 6 MHz channels.

11. The apparatus of claim 10 wherein said gateway is capable of transmitting approximately 50 channels.

12. The apparatus of claim 1 wherein said gateway transmits 256-ary signals.

13. Apparatus for providing a wireless local area network comprising:
    a plurality of tuner modules;
    a plurality of demodulators coupled to said tuner modules;
    at least one decoder coupled to said plurality of demodulators;
    a gateway firewall coupled to said at least one decoder for providing a firewall and for encrypting a forward signal;

a transmitter portion for modulating and transmitting the forward signal; and a receiver portion coupled to said gateway firewall for receiving commands from a network appliance to request one of said plurality of tuner modules to select a particular channel for transmission as the forward signal.

14. The apparatus of claim 13 wherein said plurality of tuner modules comprise one or more of the following tuners:

a VHF tuner;

a UHF tuner;

a cable channel tuner; and a DSB tuner.

15. The apparatus of claim 13 further comprising:

a reconfigurable ATM adaptation level 2 circuit coupled to an xDSL stream and to said gateway firewall.

16. The apparatus of claim 13 wherein said transmitter portion comprises:

an encoder;

an M-ary modulator; and a transmitter.

17. The apparatus of claim 16 wherein said M-ary modulator is a 256-ary modulator.

18. The apparatus of claim 13 wherein said receiver is a QPSK receiver.

19. A method of providing a wireless local area network comprising:

receiving a channel selection signal from a network appliance;

selecting a channel of information from a plurality of channels in response to said channel selection signal;

demodulating and decoding a signal in said selected channel;

coupling said signal to a gateway firewall for providing a firewall service;

encoding said signal from said gateway firewall and modulating said signal to produce an M-ary signal; and transmitting said M-ary signal to said network appliance.

20. The method of claim 19 further comprising:

demodulating and decoding said M-ary signal to display information to a user.

21. The method of claim 20 wherein said M-ary signal receiving step further comprises:

receiving said M-ary signal at said network appliance; and demodulating and decoding said M-ary signal to display information to a user.

22. The method of claim 19 wherein said M-ary signal is transmitter in the 5.725 to 5.825 GHz band.

23. The method of claim 19 wherein said M-ary signal carries 20 to 40 Mbits/sec a in 6 MHz channel.

24. The method of claim 19 wherein said channel selection signal is carried in the 5.15 to 5.25 GHz band.

25. The method of claim 19 wherein said channel selection signal comprises QPSK modulated signals.

26. The method of claim 19 wherein said M-ary signal is a 256 ary signal.

* * * * *